Patented Apr. 8, 1924.

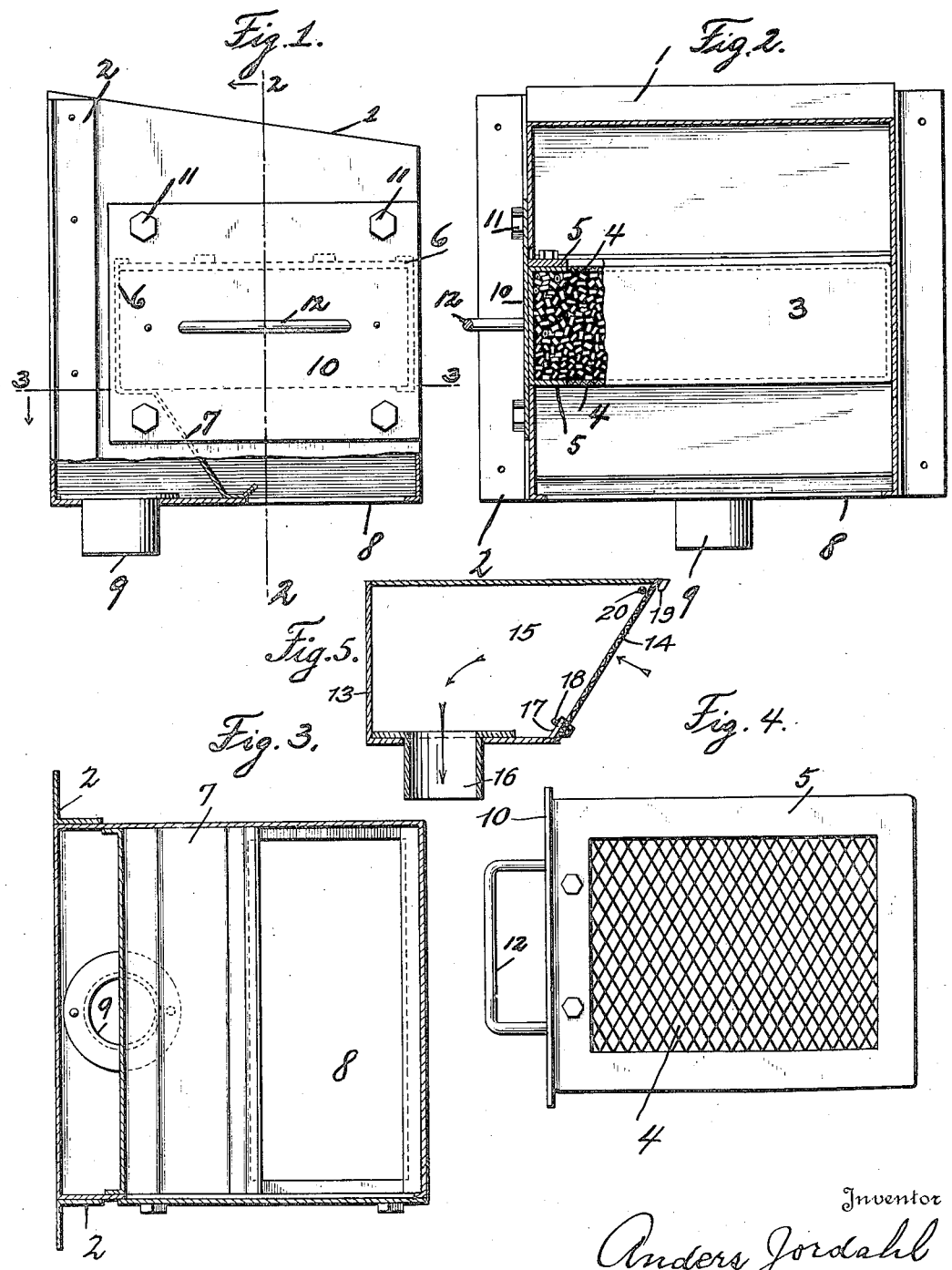

1,489,831

UNITED STATES PATENT OFFICE.

ANDERS JORDAHL, OF NEW YORK, N. Y.

AIR FILTER.

Application filed February 10, 1923. Serial No. 618,204.

*To all whom it may concern:*

Be it known that I, ANDERS JORDAHL, a subject of the King of Norway, residing at New York, in the county and State of New York, have invented certain new and useful Improvements in Air Filters, of which the following is a specification.

This invention relates to filters adapted to remove dust, grit, and other foreign substances from the air supplied to the sensitive parts of machinery, and although adapted for devices of various kinds is specially designed for use in connection with tractors, trucks, and automobiles.

In respect of structure it relates to an air filter having means providing for an upward passage of the unfiltered air, and a reverse downward passage of the air after being filtered.

The invention has for one of its objects to produce a device of the character stated, simple in construction, effective in operation for the purpose intended, durable in use, and adapted to be readily applied and operated in connection with tractors, motors, and automobiles.

A further object of the invention is to provide an air filtering device having suitable filtering elements and so constructed that the unfiltered air may be received and the filtered air discharged through the lower portion of the device.

Other objects are hereinafter more particularly stated in connection with the several parts comprising the invention.

The accompanying drawings show the preferred form of my invention, but it is to be understood that various changes and alternate constructions may be employed in lieu of that herein shown and described without departing from my invention.

In the accompanying drawings, in which similar reference numerals indicate corresponding parts throughout the several views:

Fig. 1 illustrates an air filter embodying my invention in front elevation, partly broken away;

Fig. 2 represents a vertical longitudinal section taken on the line 2—2 looking in the direction of the arrow, the container for the filtering material being shown partly in side elevation and partly in section;

Fig. 3 is a horizontal section taken on the line 3—3 of Fig. 1;

Fig. 4 is a plan of the container for the filtering elements detached from the casing; and Fig. 5 is a transverse section of a modification of the invention.

The filter is provided with an outer casing which may be of any suitable construction, but preferably having an inclined upper wall 1 for the purpose of deflecting the air laterally after passing upward out of the filtering bed. The casing may, if desired, be provided with a supporting base, or it may be supported by means of angular side brackets 2 and attached thereby to any suitable means of support.

The interior of the casing is provided with a container for holding the filtering material, preferably extending the full depth of the casing and the greater part of the width thereof.

The container may be of any suitable construction adapted to perform the functions of that herein shown and described, but is preferably formed of side walls 3 and upper and lower screen-like sections 4, preferably provided with a marginal plate 5. The lateral margins of the filtering containers may be supported in the casing in any suitable manner, such as by means of brackets or ways 6 adapted to enable the container to slide inward and outward on said ways.

The casing is provided with an auxiliary wall 7, preferably inclined, extending the length of the casing so as to form with the bottom of the container and one wall of the casing an inlet or receiving chamber for the unfiltered air, and the outer margin of said wall is preferably inclined slightly upward to aid in deflecting the incoming unfiltered air to some extent. The bottom of the casing between the lower margin of the wall 7 and one of the side walls of the casing is formed with an opening 8 providing a comparatively maximum area at the under portion of the filtering bed for the unfiltered air to pass into.

The interior of the casing above the filtering bed and at one side of said bed forms a discharge chamber having at the bottom thereof an outlet connection 9, of any suitable construction, adapted to be coupled with a pipe or conduit leading to the device for which the filtered air is to be supplied.

The filtering container may be inserted in or removed from the casing by means of a face plate 10 secured to the container and provided with a handle bar 12.

The filtering material may be of any suitable construction or formation, but for most purposes I prefer to use small cylindrical elements coated with a viscous material adapted to hold dust, grit, and other foreign mater removed from the air passing through the filter bed. The container for the filtering bed is specially adapted to be removed from the casing to enable the material forming the bed to be cleansed and replaced in position whenever occasion therefor may arise.

When the device is in operation the unfiltered air enters the casing through the aperture or opening 8 in the bottom thereof and passes upward through the filter bed and into the upper discharge chamber where it is somewhat deflected by the inclined top thereof toward one side of the casing, and then passes downward and outward through the discharge coupling 9, which in some instances may be connected with an exhaust device, drawing the filtered air from the upper portion of the casing and side thereof downward.

In the construction herein shown and described, the receiving chamber is preferably formed by means of the inclined wall 7, the walls of the casing, and the bottom of the filtering container. It is to be understood, however, that such construction, and the construction of the discharge chamber may be modified without departing from the invention. In some instances the receiving chamber may be dispensed with, as shown in Fig. 5, wherein a casing 13 is provided with a filtering member 14 of the class herein described, preferably inclined relative to the casing, which may receive the filtered air directly and discharge it into the chamber 15, from which the filtered air passes out of the discharge 16.

The filtering member 14 may be removably secured to the casing in any suitable manner, such as by means of the flange 17 and bolt connection 18, and the flange 19 and stud 20.

What I claim as new and desire to secure by Letters Patent in:

1. An air filter comprising an outer casing having an inlet opening and an outlet opening in the lower portion thereof, a container for filtering material mounted within said casing and having the area of the bottom thereof larger than the inlet opening of said casing, and an auxiliary wall extending from the bottom of said container to the bottom of said casing between said openings, forming with said container and one of the walls of said casing an inlet chamber below said container, and an outlet chamber above and at the side of said container.

2. An air filter, comprising an outer casing having an inlet opening and an outlet opening extending through the lower portion of the casing and an opening in one of the walls thereof, a container for filtering material slidingly mounted within the casing through said opening with one of its sides in contact with one of the walls of said casing, and its opposite side and the top and bottom of said container spaced from the walls of said casing opposite thereto, and an auxiliary wall extending from the spaced side of said container to the bottom of said casing between said openings, forming an inlet chamber beneath said container communicating with said inlet opening, and a discharge chamber extending above and along one side of said container communicating with said outlet opening.

3. An air filter, comprising an outer casing having oppositely disposed walls of unequal height and an inclined top connecting said walls, and provided also with an inlet opening and an outlet opening through said casing at the lower portion thereof, a container for filtering material mounted within said casing having the area of the bottom thereof larger than the inlet of said casing, and an auxiliary wall extending from the bottom of said container at one end thereof to the bottom of said casing between said openings, forming with said container and one of the walls of said casing an inlet chamber below said container and an outlet chamber above and at the side of said container communicating with the outlet opening of said casing.

4. An air filter, comprising an outer casing having oppositely disposed walls and an inlet opening and outlet opening formed in the lower portion thereof, a container for filtering material slidingly mounted within said casing and having the area of the bottom thereof larger than the inlet opening of said casing, and having the area of the top thereof smaller than the transverse area of said casing in the plane of said top, one wall of said container being secured to one wall of said casing and the opposite wall of said container being spaced from the opposite wall of said casing, and a wall connected with and supporting said opposite end of said container and extending downward to the bottom of said casing between the inlet and outlet openings therof, and having its free edge inclined upward and over the inlet opening of said casing.

In testimony that I claim the foregoing as my invention, I have signed my name hereunder.

ANDERS JORDAHL.